Dec. 22, 1936.  W. F. PIOCH ET AL  2,065,021
GEARING
Filed Oct. 3, 1935    2 Sheets-Sheet 1
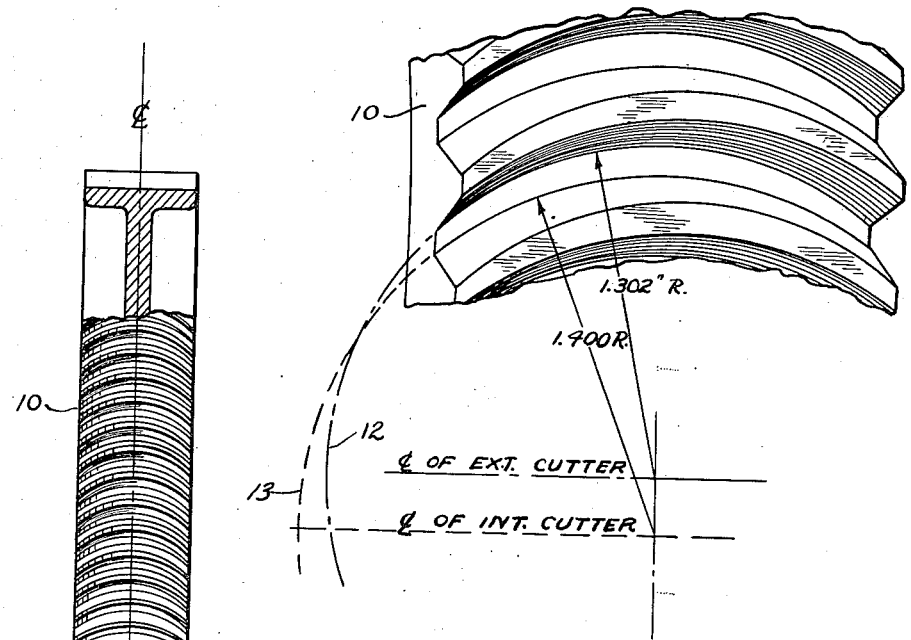
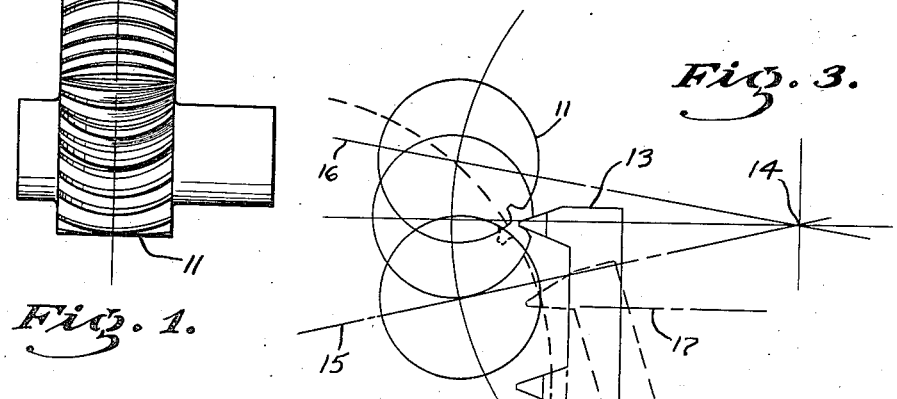
Fig. 1.   Fig. 2.   Fig. 3.
INVENTORS.
W. F. Pioch.
George Pearce.
BY
ATTORNEY.

Dec. 22, 1936.  W. F. PIOCH ET AL  2,065,021
GEARING
Filed Oct. 3, 1935  2 Sheets—Sheet 2

UNITED STATES PATENT OFFICE 2,065,021

GEARING

William F. Pioch and George Pascoe, Detroit, Mich., assignors to Ford Motor Company, Dearborn, Mich., a corporation of Delaware Application October 3, 1935, Serial No. 43,370

7 Claims. (Cl. 74—462)

The object of our invention is to provide a new design of spur type gearing especially adapted to transmit at high speeds relatively heavy loads with a minimum of gear noise.

Our gearing is believed to be an improvement over the older type gears of the general design shown. In the past gears have been provided wherein the teeth were curved across the face of the gear, somewhat similar to the applicants' gearing; however, where correctly rolling tooth action was required the radius of curvature of such teeth was required to be excessively large so that the purpose of the curved teeth was practically defeated. With our improved gearing the radius of curvature of the teeth may be made very much smaller so that an appreciable tooth overlap is obtained. This result is a distinct advantage where a relatively small pinion is meshed with a large gear, as in speed reduction drives. The minimum radius of curvature of the older type gearing was substantially two thirds of the diameter of the largest gear in the train, while the minimum radius of our improved gearing is about two thirds of the diameter of the smallest gear in the set. Thus, several times as much tooth overlap is obtained with our gearing in the average reduction drive as is possible with the older type gears.

Our improved gearing is designed to replace the conventional herringbone type of gearing so that a summary of the advantages and disadvantages of herringbone gearing may not be out of place. Herringbone type gearing has several advantages not obtainable with either straight or helical tooth gears, one being that the tooth overlap which is a requisite for quietness of operation is obtained in the herringbone type of gear without side thrust on either the gear or pinion. Such side thrust is, of course, unavoidable in helical type gearing. However, herringbone gears have certain inherent disadvantages, the main disadvantage being that the teeth upon one side of the gear must be exactly aligned with the teeth on the other side of the gear or extremely noisy operation will result. The pitch circles of the two halves of the gear must be exactly aligned, and the tooth thickness of the respective halves must be identical. Otherwise, the load will be transferred from one side of the gear to the other side which invariably sets up a vibration noise which is usually more objectionable than the inherent noise of straight tooth gearing. Perhaps the most outstanding feature of involute gearing over cycloidal gearing is that a true rolling action is obtained even though the center distances of the gears or tooth thickness are varied through an appreciable range. This permits quiet operation in spite of manufacturing errors where a single helical gear train is employed. However, when two helical gears are used, as in the herringbone construction, the gears must be identical in order to take advantage of this characteristic of involute gears; otherwise, the load will be transferred back and forth from one gear to the other.

The applicants secure exact alignment of the teeth in the respective sides of their gear by cutting the teeth on both sides of the gear with the same cutting tool and at the same time. Absolute alignment of adjacent teeth is unavoidable with this type of gear whereas with the herringbone type of gear separate cutters must of necessity be used on the respective halves of the gear which cutters vary in size, due to sharpening and manufacturing errors.

The foregoing has been mentioned to bring out that an error in manufacture of the teeth of a herringbone gear, sufficient to cause excessive noise, may not be sufficient to cause noise when incorporated into a helical gear. The advantage of being able to form the complete tooth from one side of the gear to the other with the same cutting edge insures identical mating teeth and consequently, quieter operation than is possible with the ordinary herringbone gear.

The foregoing advantage of this shape of gear tooth applies equally well to the older type gears of this class but has been mentioned to bring out the advantages of this class of gear as a whole and to show the desirability of improving the gear to the point where its tooth curvature may produce an overlap equivalent to the herringbone tooth gear.

A further object of our invention is to provide a gear having teeth thereon, of the class described, wherein a limited axial misalignment is compensated for. Herringbone gears require a fixed axial alignment so that, if one side of the gear is a few thousandths of an inch out of line with the other side, as usually happens when the gear is hardened, then the gear as a whole must reciprocate axially through this distance upon each revolution thereof. Vibration is thus unavoidable where high speed operation is attempted. The applicants' gearing is unique in that a limited axial play is permitted to compensate for misalignment due to hardening.

With these and other objects in view our invention consists in the arrangement and construction of the various elements comprising our improved gearing, as described in the specification, claimed in our claims, and illustrated in the accompanying drawings, in which:

Figure 1 shows a plan view of a gear and pinion constructed according to our invention.

Figure 2 shows an enlarged perspective view of the teeth on the face of the gear, shown in Figure 1.

Figure 3 is a diagrammatic view, illustrating the method of generating the pinion teeth.

Figure 4:
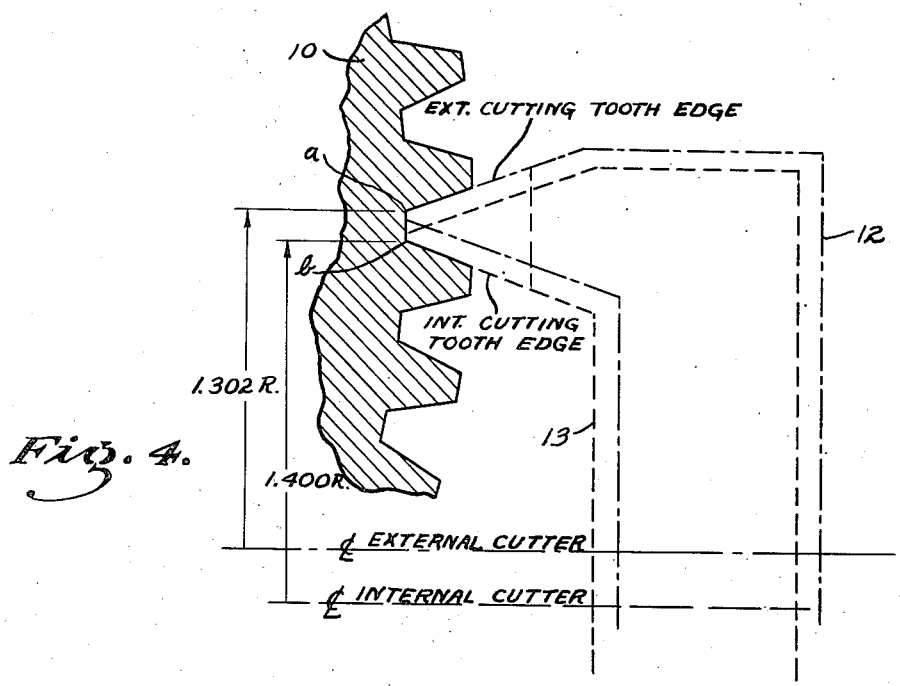
Figure 4 is a diagrammatic view, illustrating the position of the cutters used when machining the gear.

Before describing in detail the specific means for cutting the applicants' gears, it may be well to mention that the gear teeth shown differ from the involute system in that involute gear teeth are generated from a flat basic rack having either a 14½ or 20 degree pressure angle, while the applicants' gear teeth are not generated, the pinion teeth only being generated and from a circular master gear having a diameter equal to the diameter of the gear. Formerly, gears similar to the applicants' have been suggested but in each case the teeth on both the gear and pinion were required to be generated to secure correct tooth action. In the applicants' construction correct tooth action is obtained by generating the pinion only. As will be brought out later in the specification, this characteristic permits the use of teeth having a smaller radius of curvature to thereby secure a tooth overlap more nearly that produced in herringbone gears.

It will be noted from the following table of gear characteristics that neither a standard diametral nor circular pitch is used. The pitch is not important because only straight sided cutters are required, one for each side of the teeth. Such straight sided cutters will, of course, form teeth of any pitch or fraction thereof. In most installations only the gear center distance and the tooth ratio are fixed conditions so that the applicants' design, not being limited to standard pitches, is more flexible than conventional systems of gearing.

The following table shows the characteristics of the gearing described in this specification:

Center distance _____ 5.500''
Diametral pitch _____ 7.9091''
Circular pitch _____ .3972''

|  | Pinion | Gear |
|---|---|---|
| Number of teeth | 18 | 69 |
| Pitch diameter | 2.276'' | 8.724'' |
| Addendum | .180'' | .055'' |
| Dedendum | .080'' | .205'' |
| Whole depth | .260'' | .260'' |
| Working depth | .235'' | .235'' |
| Pressure angle | 20° | 20° |
| Outside diameter | 2.636'' | 8.834'' |
| Chordal thickness at ℄ Fig. 1 | .250'' | .140'' |
| Corrected addendum at ℄ Fig. 1 | .185'' | .056'' |

Referring to the accompanying drawings, we have used the reference numeral 10 to designate a gear blank while the numeral 11 is used to designate a pinion which is adapted to mesh therewith. The teeth on both the gear and the pinion are arcuate; that is, the teeth are curved in a plane substantially tangent to the blank at the point of the tooth. Each of the teeth comprises a portion of the circumference of a circle, the center of each circle lying in the plane of the blank.

The apparatus for cutting the gear is shown in Figure 4, from which it will be seen that both an external and an internal cutter are used to form the respective sides of the gear teeth. A roughing cutter, not shown, is desirable for use in shaping the teeth in preparation for the finishing cutters shown. The cutters each comprise a ring and straight sided cutting teeth which project axially from the periphery of a cutter base. One of the cutters is ground so that the external edges of the teeth form the cutting edges while the other cutter is ground so that the internal edges of the teeth form the cutting edges. Dot and dash lines 12 designate the external cutter while dash lines 13 designate the internal cutter. The same cutters are used for forming both the pinion and the gear. More than one roughing cutter may be used simultaneously in gashing the gear and pinion. Also, both finishing cutters may be used simultaneously to machine the opposite sides of the teeth on the gear.

The normal procedure in forming the gear 10 is to mount the gear blank upon an index head and to remove the metal from between the teeth with a double edged roughing cutter of approximately the same shape as the cutters 12 and 13. After this gashing operation is complete the cutter 13 is fed into the position shown in Figure 4 to form the convex sides of the teeth, the gear blank being indexed for each tooth. The concave sides of the teeth are then likewise finished with the cutter 12. It is important that the teeth on the gear have straight sides to form what may be termed an arcuate rack.

Referring to Figure 3, the method of generating the pinion 11 is shown. The pinion is rotatably mounted upon a suitable spindle which is arranged to oscillate around a center 14, which center 14 is spaced from the center of the pinion 11 a distance equal to the center distance between the gears 10 and 11. A gear having the same pitch diameter as that desired for the pinion 11 is fixed to rotate with the pinion blank, this gear being adapted to mesh with a segment gear having the same pitch diameter as the gear 10. Consequently when the pinion blank is swung from the position shown by line 15 to that shown by line 16, the pinion blank 11 will be rotated sufficiently that a true rolling action of the pitch circle of the pinion is obtained. The cutter 12 is arranged to rotate upon its center line 17 with its cutting teeth aligned with the center 14.

The generating action about to be described is preferably performed with both the roughing and finishing cuts. The pinion is first indexed to the position where one of the spaces between the teeth is aligned with the cutting portion of the cutter 12. The cutter is then rotated while in the position shown in Figure 3. The pinion is slowly swung from the position shown by line 15 to that shown by line 16. One side of one gear tooth is thus generated. The pinion is now swung back to its former position and is indexed through the circular pitch and the operation repeated for each successive tooth. After this is completed the internal cutter 13 likewise is used to form the external sides of the teeth.

It is extremely important that the teeth on the gear 10 are formed as rack teeth and that the pinion is generated around a center spaced therefrom a distance equal to the center distance between the gear and the pinion. A relatively small diameter cutter may thus be used to generate the pinion so that maximum tooth curvature is obtained. If it were required to also generate the gear then a cutter of a diameter shown by dotted lines 18 in Figure 3 would be required. The position of the gear 10, if the same were to be generated, is shown by dotted lines 19 from which it will be seen that a much larger cutter would be necessary in order to prevent the portion of the cutter opposite to the cutting section from contacting with the gear teeth. Where the cutter is simply fed in radially as in the applicants' gear no interference results. This is shown in Figure 3 by dotted lines 20 which represent the position of such a cutter when operating upon the gear shown by dotted lines 19. Thus, several times the tooth overlap is obtained by this method of forming as is possible with the older type of gears.

The applicants' cutters 12 and 13 are so designed that the convex side of each tooth has a slightly less radius than the concave side of the mating tooth at each point of contact. Thus a limited axial misalignment between the gear and pinion teeth is permissible without causing vibration when the gears are operated.

Figure 5:
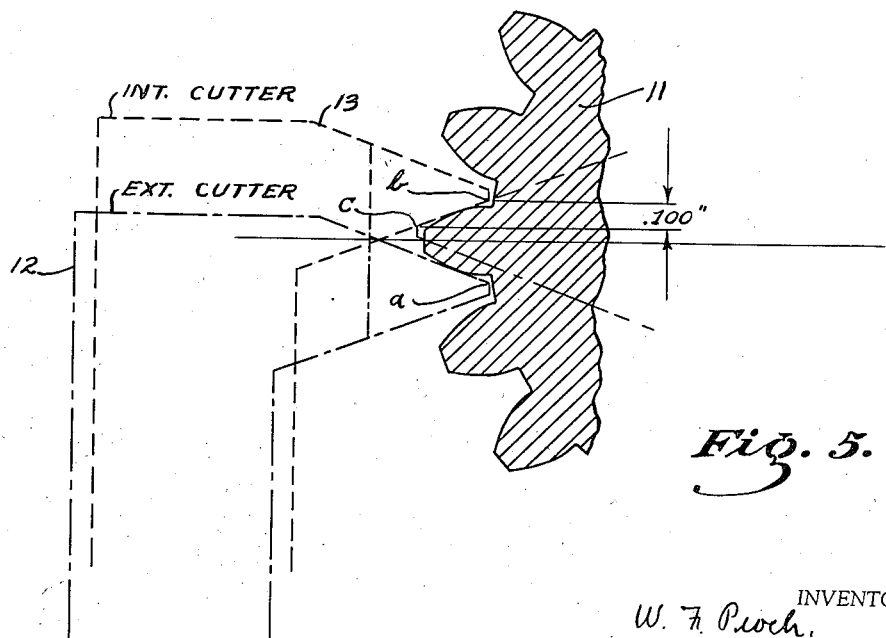
Figure 5 is a diagrammatic view, illustrating the position of the same cutters when used to generate the pinion.

In Figure 4 the point of the teeth of the cutter 12 is shown by letter (a) while letter (b) shows a similar point on the cutter 13. The radius of the cutter 12 at point (a) is 1.302" while the radius of the cutter 13 at point (b) is 1.400". The pressure angle in each case is 20 degrees. The radius of the concave side of each tooth at its root is thus 1.302" and, of course, increases towards the outer end of the tooth. The radius at a point beyond the outer end of the tooth or where it would contact with the root of the meshing tooth is .100" larger or 1.402". This point is shown by letter (c) in Figure 5. As the point (b) on the internal cutter has only a radius of 1.400" a difference of .002" in the radius at all contacting points is obtained. This may be better stated by saying that the teeth at the center of both the gear and pinion are slightly thicker than at their ends.

Among the many advantages resulting from our improved construction it may be well to repeat that a small radius of curvature is obtained while still retaining a true rolling action for the gears. This results in several times the tooth overlap hereto possible with generated gears of this shape.

Still further by making the convex side of each tooth with a radius slightly smaller than the concave side of the mating tooth at each contacting point, errors due to hardening and machining are rendered ineffectual to produce noisy operation.

The reduction in manufacturing cost because of only having to generate the small pinion is considerable as is believed obvious.

The above disclosure shows only the use of cutting tools; however, it is obvious that similarly shaped grinding wheels may be employed to grind both the gear and pinion teeth when desired.

Some changes may be made in the arrangement, construction and combination of the various parts of our improved device without departing from the spirit of our invention and it is our intention to cover by our claims such changes as may reasonably be included within the scope thereof.

We claim as our invention:

1. The combination of a gear and pinion, said gear having non-generated teeth formed around its periphery, the basic rack for said teeth being curved, and said pinion having generated teeth formed therearound of a pitch equal to said gear teeth, the basic rack for said pinion teeth being curved with a radius equal to the radius of the rack for said gear teeth.

2. The combination of a gear and pinion, said gear having non-generated teeth formed around its periphery, and said pinion having generated teeth formed therearound of a pitch equal to said gear teeth, the basic rack around which said pinion teeth are generated being curved with a radius equal to the radius of said gear.

3. The combination of a gear and pinion, said gear having non-generated straight sided gear teeth formed around its periphery, and said pinion having teeth generated thereon of a pitch equal to said gear teeth, the basic rack around which said pinion teeth are generated being curved and of a radius equal to the radius of said gear.

4. A gear and pinion construction comprising, a gear having non-generated teeth formed around its periphery, the basic rack for said teeth being curved, and said teeth being arcuate from end to end, each of said teeth lying in a plane which is tangent to the periphery of the gear at said tooth, and the center of each of said arcuate teeth lying in a plane which passes through the plane of said gear, and a pinion having similarly shaped arcuate teeth generated thereon, the basic rack for said pinion teeth being curved and of the same radius as the rack for said gear teeth.

5. A gear and pinion construction comprising, a gear having non-generated straight sided gear teeth formed around its periphery, said gear teeth being of arcuate shape from end to end with the arc of each tooth lying in a plane tangent to the periphery of said gear at the point of said tooth, and a pinion having similarly shaped arcuate teeth generated thereon of a pitch equal to said gear teeth, the basic rack for said pinion teeth being circular and of a diameter equal to the pitch diameter of said gear.

6. A gear and pinion construction comprising, a gear having non-generated straight sided gear teeth formed thereon around its periphery, each of said gear teeth being of arcuate shape from end to end with said arc lying in a plane tangent to the periphery of said gear at the point of said tooth, intermediate portions of each of said gear teeth being thicker than the end portions thereof, and a pinion having teeth generated thereon of a pitch equal to said gear teeth, the basic rack for said pinion teeth being circular and of a diameter equal to the pitch diameter of said gear, and the intermediate portions of said pinion teeth also being thicker than the end portions thereof.

7. A gear and pinion construction comprising, a gear having non-generated straight sided gear teeth formed around its periphery, said gear teeth being of arcuate shape from end to end with said arc lying in a plane tangent to the periphery of said gear at the point of said tooth, the concave face of each gear tooth having a pitch line radius greater than the pitch line radius of the convex side of said tooth, and a pinion having generated teeth thereon of a shape similar to said gear teeth, the basic rack of said pinion teeth being circular and of a diameter equal to the pitch diameter of said gear.

WILLIAM F. PIOCH.
GEORGE PASCOE.